United States Patent

Polka

Patent Number: 5,823,635
Date of Patent: Oct. 20, 1998

[54] METHOD AND APPARATUS FOR ATTACHING A COVER TO THE WHEEL OF A VEHICLE WHERE THE WHEEL HAS HAND HOLES

[76] Inventor: John G. Polka, 1355 Margate, Libertyville, Ill. 60048

[21] Appl. No.: 671,528

[22] Filed: Jun. 27, 1996

[51] Int. Cl.⁶ ....................................................... B60B 7/06
[52] U.S. Cl. ........................................ 301/37.1; 301/37.28
[58] Field of Search ................................ 301/37.1, 37.28, 301/37.31, 37.34, 37.37, 37.42

[56] References Cited

U.S. PATENT DOCUMENTS

| | | | |
|---|---|---|---|
| 2,584,452 | 2/1952 | Horn | 301/37.1 |
| 2,614,001 | 10/1952 | Rycroft | 301/37.1 |
| 4,725,100 | 2/1988 | Patti | 301/37.28 |
| 4,761,040 | 8/1988 | Johnson | 301/37.37 |
| 5,167,440 | 12/1992 | Fitzgerald | 301/37.28 X |
| 5,253,920 | 10/1993 | Patti | 301/37.1 X |

FOREIGN PATENT DOCUMENTS 2603528  3/1988  France ................................. 301/37.42

*Primary Examiner*—Russell D. Stormer
*Attorney, Agent, or Firm*—Patnaude, Videbeck & Marsh

[57] ABSTRACT

Brackets are fitted on the inner surface of a wheel cover to attach the wheel cover to a wheel having a plurality of hand holes. Each of the brackets has at least one finger adapted to fit through a hand hole on a wheel and extend behind the web of the wheel. The brackets are adjustable between a first condition in which the finger is movable with respect to the wheel cover, and a second condition in which the finger of the bracket is locked behind the web of a wheel.

13 Claims, 5 Drawing Sheets

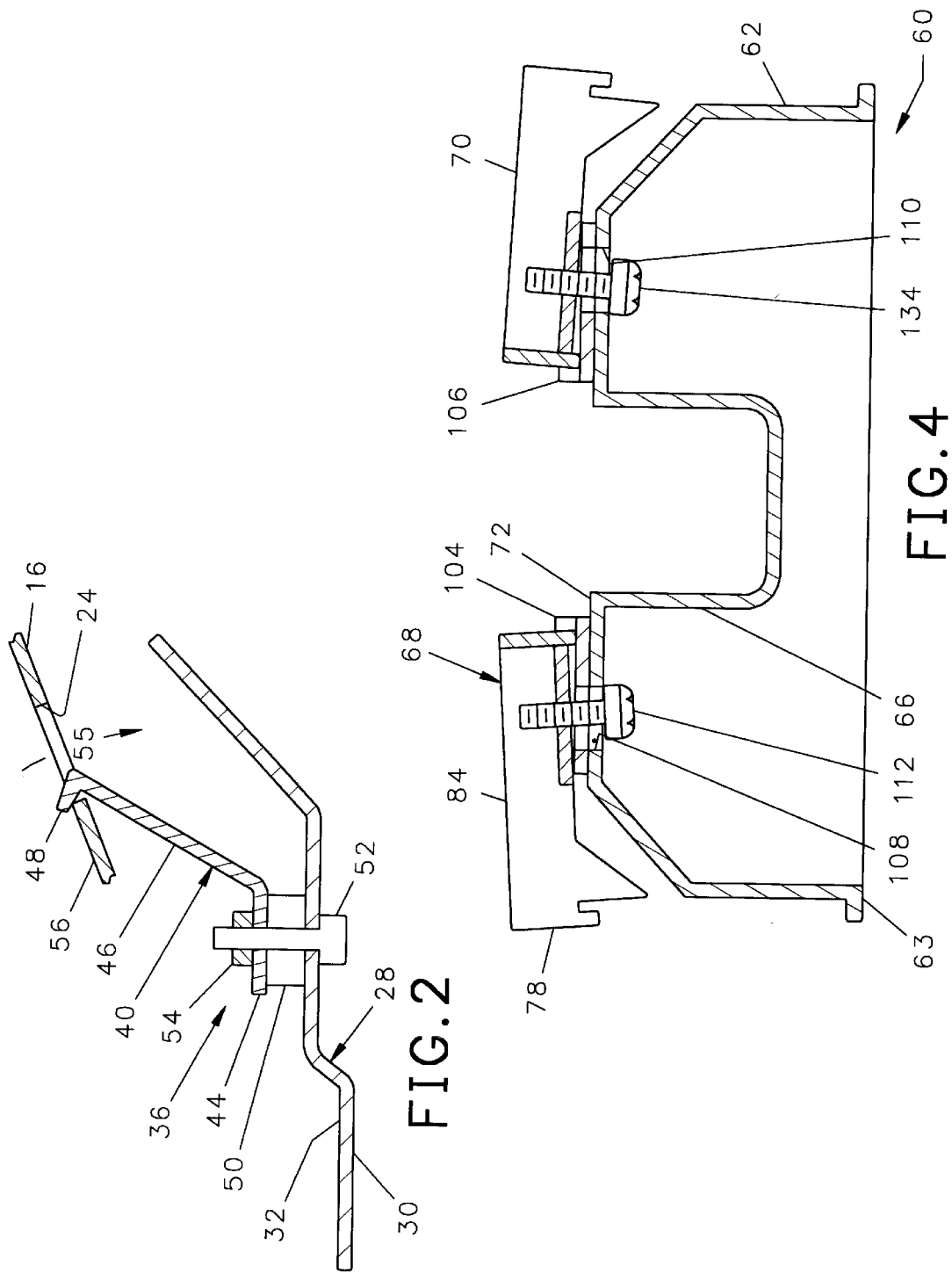

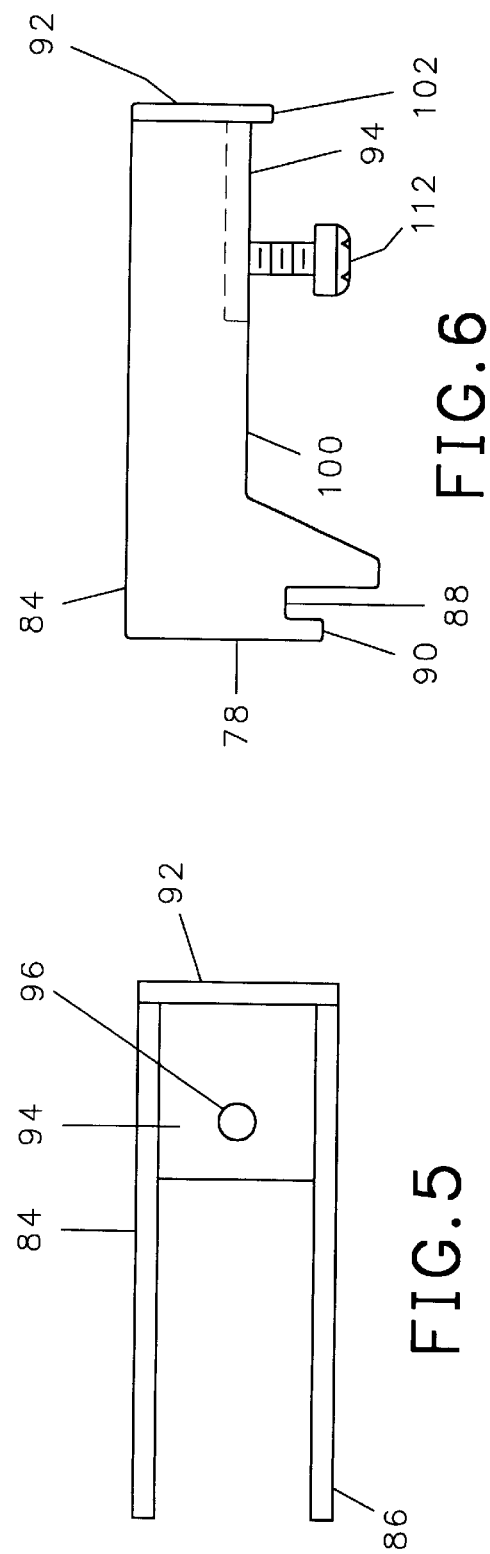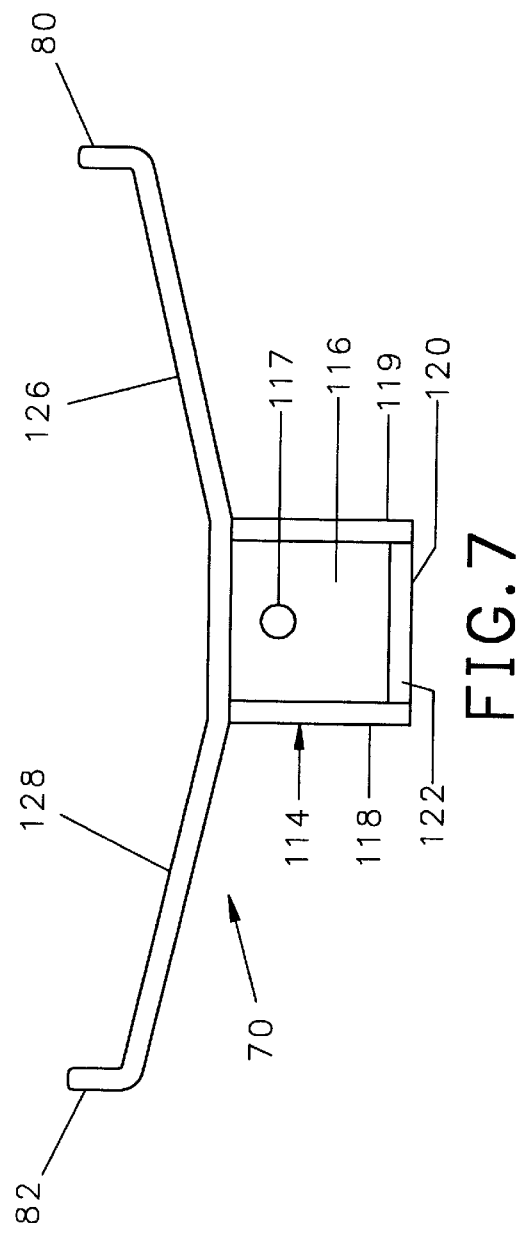

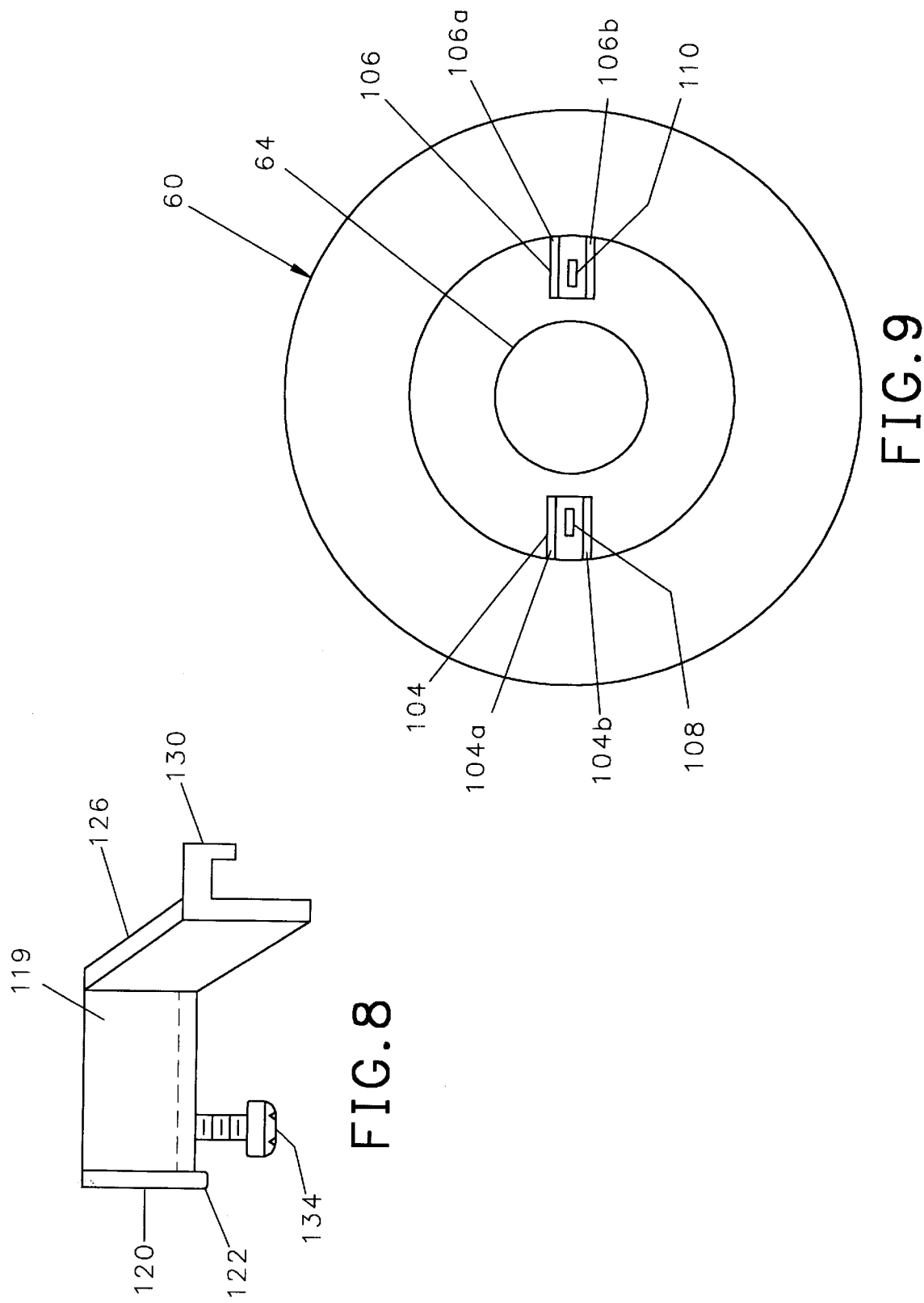

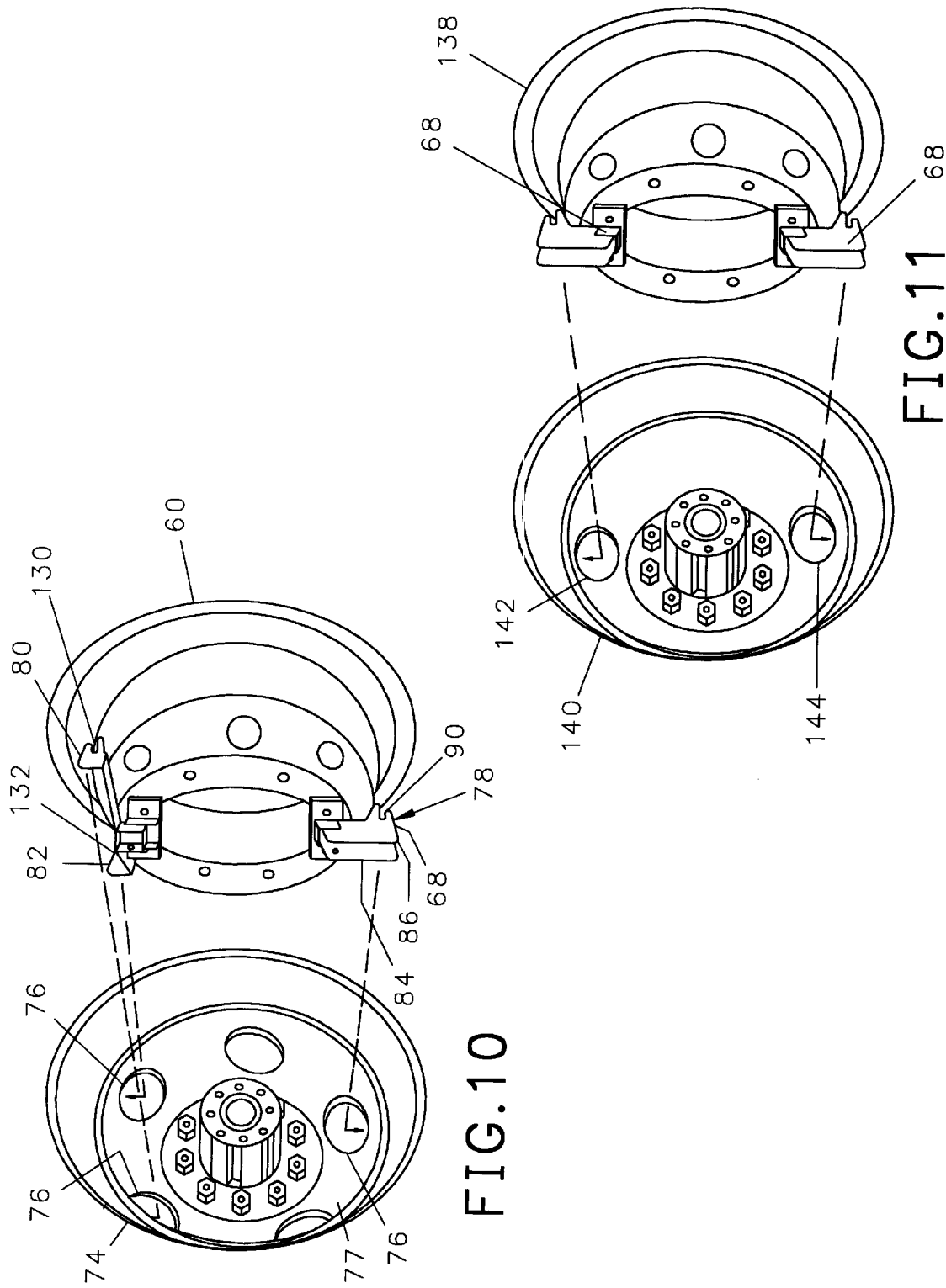

METHOD AND APPARATUS FOR ATTACHING A COVER TO THE WHEEL OF A VEHICLE WHERE THE WHEEL HAS HAND HOLES

The present invention relates to covers for wheels, and in particular to a method and apparatus for attaching a cover to a wheel which has hand holes.

BACKGROUND OF THE INVENTION

The manufacturers of trucks, recreational vehicles, tow trucks, buses and other larger vehicles generally do not provide covers for the central portions of the wheels of the vehicles they manufacture. Nonetheless, it has become common in recent years for the owners of larger vehicles, even large semi-tractors, to improve the appearance of their respective vehicles by covering the unsightly central portions of the wheel with wheel covers produced by a number of after market manufacturers.

Since such large vehicles are not provided with wheel covers by their respective manufacturers, the wheels for such vehicles do not have ridges or clamps to which a wheel cover can be attached, and wheel cover manufacturers have developed products which attach to functional portions of the wheel. The most common method for attaching a wheel cover is to provide holes in the cover, or in an adapter to which the cover can be attached, which are spaced to receive the studs which extend from the hub of the vehicle. The wheel liner, or retainer, is then fitted over the wheel and is retained thereon by the same lug nuts which retain the wheel to the hub.

Certain states, such as California, require that trucks traveling on open roads are subject to having the webs of their wheels tested for cracks in the vicinity of the lug nut, and such inspection requires removal of any wheel cover or retainer which is fitted under a lug nut. The lug nuts of such larger vehicles are generally tightened by pneumatic machines which are not available on the open road, and the inspection of the truck wheels which have covers fitted under the lug nuts must be taken off the open road to a location where the lug nuts can be removed.

Wheel covers have also been attached to vehicle wheels by providing a retainer which is attached under bolts retaining an oil cover across the distal end of the axle which extends through the center of a wheel. Such retainers, however, require that portions of the oil cover at the distal end of the axle be removed to attach the retainer.

Wheel covers have also been attached to vehicle wheels by providing clamps which frictionally grasp a lug nut which retains the wheel to the hub of the vehicle. In some circumstances, friction alone is insufficient to retain the wheel cover to a wheel.

Wheels of the type used on trucks and the like, have an outer rim around which a tire is fitted, and a web portion having a central opening through which the distal end of the axle of the vehicle extends. Such wheels also have a plurality of smaller openings around the outer edge of the web, commonly called hand holes, to facilitate the installation or removal of the wheel to the hub of a vehicle.

SUMMARY OF THE INVENTION

Briefly, the present invention is used to attach a wheel cover to a wheel of the type having a web, a central opening and an outer rim and a plurality of hand holes at given locations around the perimeter of the web. Although there are numerous manufacturers of vehicles, and a corresponding large number of configurations of truck wheels, the outer diameter of the rims around which the tires are fitted come in certain specific sizes for receiving standardized sizes of tire. Therefore, wheel covers can be manufactured having certain specific diameters. Also, since nearly all such wheels have hand holes, a manufacturer of wheel covers which employ the hand holes of a wheel to retain a wheel cover does not need to manufacture a separate cover to fit the wheel of each truck manufacturer.

There are generally two commonly used configurations of hand holds for such wheels. In the first configuration, two oval shaped hand holds are provided at 180 degrees apart from one another, and in the second five oval shaped holes are equally spaced through the web. All the hand holes are positioned adjacent the rim of the wheel and have dimensions large enough to readily receive a man's hand.

In accordance with the present invention, a plurality of brackets are fitted on the inner surface of a wheel cover to attach the wheel cover to a wheel having a plurality of hand holes. Each of the brackets has at least one finger adapted to fit through a hand hole on a wheel and extend over an inner surface of the web of the wheel. The attachment of at least one of the brackets is adjustable between a first condition in which the finger is movable with respect to the wheel cover, and a second condition in which the bracket is unmovable with respect to the wheel cover.

To assemble the wheel cover fitted with brackets in accordance with the present invention, the fingers of the brackets are fitted through the hand holes of a wheel and positioned to extend along an inner surface of the web of the wheel while the bracket retainer is in the movable condition. Thereafter, the clamps are moved to the second condition wherein the fingers are unmovable with respect to the cover, thereby retaining the cover to the wheel.

BRIEF DESCRIPTION OF THE DRAWINGS

A better and more complete understanding of the present invention will be had after a reading of the following detailed description taken in conjunction with the drawings wherein:

FIG. 2 is a fragmentary cross-sectional view of the wheel cover and one of the brackets shown in FIG. 1;

FIG. 4 is a cross-sectional view of a second embodiment of the invention adapted for retaining a wheel cover across a double wheel of the type generally provided as the rear wheel of trucks and the like;

FIG. 5 is a bottom view of a bracket as shown in the left portion of FIG. 4;

FIG. 6 is a side view of the bracket shown on the left side of FIG. 4;

FIG. 7 is a top view of the bracket in accordance with the present invention shown on the right hand side of FIG. 4;

FIG. 8 is a side view of the bracket shown in the right side of FIG. 4;

FIG. 9 is an inside view of the wheel cover shown in FIG. 4 with the brackets removed so that the guides used to position the brackets are visible;

FIG. 10 is an isometric view of the wheel cover and brackets shown in FIG. 4 ready for assembly to a wheel having five hand holes spaced through the web thereof; and FIG. 11 is an isometric view of a wheel cover fitted with two brackets of the type shown on the left side of FIG. 4, the wheel cover positioned for attachment to a wheel having two hand holes spaced around the web thereof.

DETAILED DESCRIPTION OF THE
PREFERRED EMBODIMENTS

Figure 1:
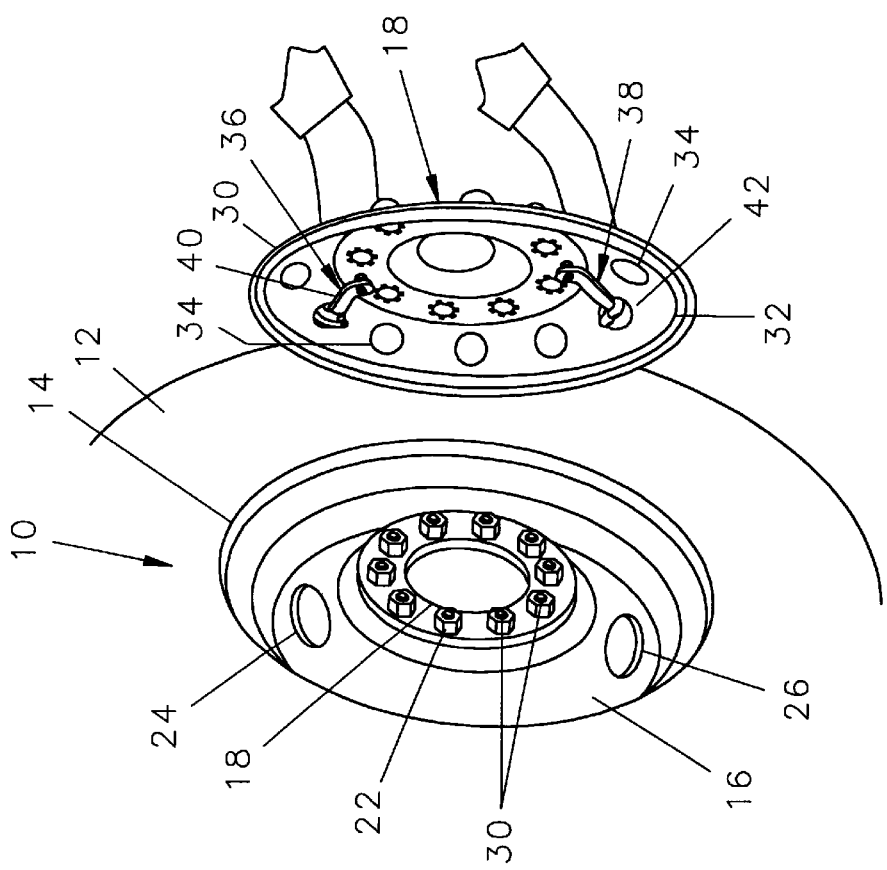
FIG. 1 is an isometric view of a front wheel of a vehicle and of a wheel cover having an attachment bracket in accordance with the present invention.

Referring to FIG. 1, a wheel 10 has a tire 12 fitted around its outer rim 14, and extending across the central portions of the wheel 10 is a web 16 having a central opening 18 through which a central portion of the axle, not shown, may extend. The wheel 10 is retained on the hub of a vehicle by a plurality of studs 20—20 which extend through a corresponding plurality of spaced holes in the web 16 which are not visible because they are covered by a corresponding plurality of lug nuts 22 for retaining the wheel 10 to a hub.

Piercing the outer perimeter of the web 16 are first and second hand holds 24, 26, respectively, and attachable across the outward surface of the wheel 10 is a wheel cover 28 in accordance with the present invention. The wheel cover 28 has a disk shaped body 30 with an inner surface 32 and a plurality of decorative holes 34 spaced around the outer perimeter of the body 30. Attached to the inner surface 32 of the body 30 are first and second brackets 36, 38, respectively, each having an elongate arm 40, 42. As can be seen in FIG. 1, one who seeks to attach a wheel cover 28 in accordance with the present invention to a wheel 10 may extend his fingers through the decorative holes 34 to manipulate the arms 40, 42 of the brackets 36, 38 to facilitate the attachment of the wheel cover 28 to a wheel 10 as further described below.

Referring to FIG. 2, in which one bracket 36 is depicted, the arm 40 has a generally planar mounting portion 44 from which extends an elongate portion 46 at the distal end of which is a transversely oriented finger 48.

Positioned on the outward surface of the mounting portion 44 is a flexible spacer 50 made of any suitable compressible material such as a rubber washer or the like. A bolt 52 extends through aligned holes in the cover body 30, the spacer 50 and the mounting portion 44, and the parts are retained in assembled relationship by a threaded nut 54 which is welded to the inner surface of the mounting portion 44 so that it will not rotate when the bolt 52 is turned.

The bolt 52 which retains the bracket 36 to the wheel cover 28 can be loosely threaded into the nut 54 such that the compressible spacer 50 is fully expanded or in a relief condition. In this loosely assembled relief condition, the mounting portion 44 of the arm 40 is spaced from the inner surface 32 of the wheel cover 28 a distance equal to the thickness of the expanded spacer 50. Also, when the bracket is in the relief condition, the arm 40, including the finger 48 of the arm, is angularly movable, that is, the distal end of the arm and finger 48 can move through an arch 55 movable by pivoting the mounting portion around the bolt 52, causing one portion of the spacer 50 to become at least partially compressed. When the distal end of the arm 40 is not manually manipulated, it will be urged by the compressible spacer 50 to return to a static condition with the planar surface of the mounting portion 44 parallel to the adjacent planar surface of the cover 28 as shown in FIG. 2.

When the brackets 36, 38 are in the relief condition, the distal ends of the arms 40, 42 are spaced a distance from the center of the cover body 30 which is equal to the distance of the inner edge of the hand holes 24, 26 from the center of the wheel 10. The brackets 36, 38 are also positioned on the cover body 30 at locations complementary to the locations of the hand holes 24, 26 so that the fingers 48—48 will extend along an inner surface 56 of the web 16 when the distal ends of the arms 40, 42 are extended through aligned hand holes 24, 26 in the web.

When the bolt 52 is tightly threaded into the nut 54, tightening of the bolt 52 will draw the mounting portion 44 toward the inner surface 32 and compress the spacer 50. In this condition the arm 40 will then be substantially immovable with respect to the wheel cover 28 because of the tension applied along the length of the arm 46.

Figure 3:
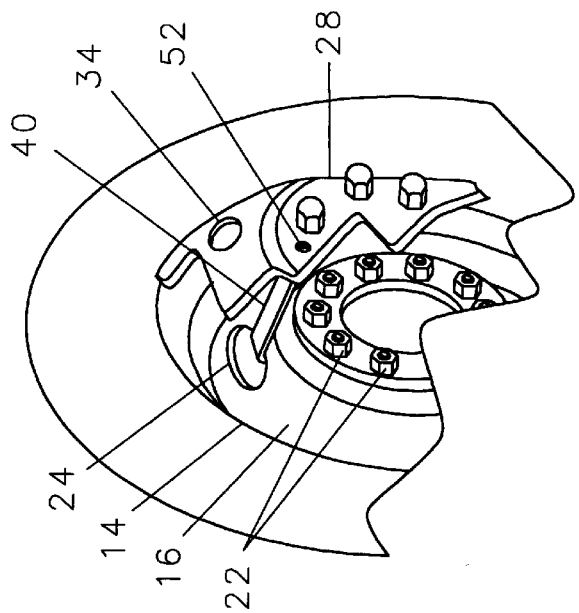
FIG. 3 is a fragmentary isometric view of a wheel fitted with the wheel cover and bracket shown in FIG. 1.

Referring further to FIG. 1, one can assemble a wheel cover 28 having brackets 36, 38 on the inner surface thereof to a wheel 10 having hand holes 24, 26 by grasping the distal ends 40, 42 of the arms and pivoting them radially outward from the center of the wheel cover 28 as it is fitted over the wheel 10. Each of the fingers 48 is fitted through one of the hand holes 24, 26 after which the distal ends of the brackets are released and allowed to return to their static condition wherein the fingers 48 will extend along a portion of the inner surface 56 of the web 16. Thereafter, the bolts 52 can be tightened into the associated nuts 54 to compress the spacers 50 and draw the wheel cover 28 tightly against the outer surfaces of the wheel 10 to the condition shown in FIG. 3.

The wheel cover 28 is depicted as having two brackets, 36, 38 spaced diametrically apart from each other for attaching to a wheel cover having diametrically opposing hand holes 24, 36. It should be appreciated that where a wheel has five hand holes, or some other odd number of hand holes, a wheel cover can be fitted with three or more brackets on the inner surface thereof spaced such that the arms thereof will extend into three of the associated hand holes of a wheel.

Referring to FIG. 4, a wheel cover 60 is depicted as having a generally cylindrical body 62 with an outer rim 63, a tubular central high hat 64 and a central web portion 66, which is the typical configuration of a cover suitable for fitting within the concave outer portions of a double truck wheel with the central portion of the axle extending into the high hat 64.

Fitted on the inner surface 72, where the inner surface is defined as the surface which is enclosed when the wheel cover is assembled to a wheel, are a pair of brackets 68, 70 in accordance with another embodiment of the present invention.

Referring to FIG. 10, the wheel cover 60 is of the type adapted to fit into the concave portions of the double rear wheels 74 of a truck or other vehicle which has five spaced hand holes 76—76 in the web 77 thereof. In this embodiment, bracket 68 has a hook end 78 adapted to extend into one hand hole 76, and bracket 70 has two spaced apart hook ends go, 82 adapted to fit into adjacent hand holes 76—76 of the wheel 74.

Referring to FIGS. 4, 5 and 6, the bracket 68 has parallel arm portions 84, 86, each of which has a notch 88 at the hook end 78 thereof and an elongate finger 90. The parallel arm portions 84, 86 are retained in alignment to each other by a perpendicular end plate 92 and a transverse mounting plate 94 having a transverse threaded hole 96 therein.

As can best be seen in FIGS. 4 and 6, the arm portions 84, 86 have parallel straight mounting sides 100 which are coplanar with the mounting surface of the mounting plate 94. The end plate 92 has a lip 102 which protrudes beyond the plane of the mounting sides 100 such that the mounting plate 94 cannot be positioned parallel to an adjacent planar surface.

Referring to FIG. 9, the inner surface 72 of the wheel cover 60 has mounting plate 104, 106 positioned diametrically apart from each other around the high hat 64, and each of the mounting plates 104, 106 has parallel outwardly extending guide members 104A, 104B, and 106A, 106B, respectively. Extending parallel with and midway between the respective guide members 104A, 104B, and 106A, 106B are elongate slots 108, 110, respectively, each of which has a width sufficient to receive a bolt sized to be threadedly fit within the threaded hole 96 of the mounting plate 94.

The spacing between the guides 104A, 104B, of mounting plate 104 and 106A, 106B of mounting plate 106 is a little greater than the spacing between the outer edges of the arm portions 84, 86 of the bracket 68, and as shown in FIG. 4 the bracket 68 will be radially slidable within the associated mounting plate 104 when a bolt 112 is extended through one of the slot 108 and threaded into the hole 96. When assembled in this configuration, the mounting sides 100 of the arm portions 84, 86 will be against the inner surface 72 of the wheel cover 60 and the distal end of the lip 102 will fit between the associated guide numbers 104A, 104B. The finger 90 and the associated notch 88 on the hook end 78 thereof are then axially adjustable by movement of the bolt 112 within the slot 108.

Referring to FIGS. 4, 7 and 8, the second bracket 70 has a generally rectangular mounting portion 114 consisting of a mounting plate 116 having a threaded mounting hole 117 therein, and bordered on opposing sides by side members 118, 119, the outer surfaces of which are spaced from each other a distance equal to the spacing of the outer surfaces of arm portions 84, 86 of bracket 68. The mounting portion 114 further has an end plate 120 having a lip 122 which extends beyond the plane of the outer mounting surface of mounting plate 116.

Extending from the mounting portion 114 are outwardly extending arms 126, 128, at the distal end of each of which are hook ends 80, 82 including an elongated finger 130, 132. As best shown in FIG. 4, the bracket 70 is retained on the second mounting plate 106 by a second bolt 134 extending, through slot 110 and into the threaded hole 117 of the bracket 70 with the mounting plate 116 and lip 122 fitted against the inner surface of the wheel cover 60.

As best shown in FIG. 10, the arm portions 84, 86 of the first bracket 68 are sized to fit the hooked ends 78 thereof against an outer edge of a hand hole 76 of the wheel 74 with the fingers 90 extending along a portion of the inner surface of the web 77. Similarly, the arms 126, 128 of the second bracket 70 are sized to fit the hook ends 80, 82, respectively thereof, into adjacent hand holes 76—76 of the wheel 74 with the fingers 130, 132, respectively, also extending along a portion of the inner surface of the web 77 of the wheel 60.

Referring to FIG. 4, it can be seen that the bolts 112, 134 may be loosely threaded into the retaining plates of the respective bracket 68, 70, such that the brackets 68, 70 are freely radially slidable within the guides of the mounting brackets 104, 106. Also, the lips 102, 122 positioned on the inner ends of the bracket 68, 70, respectively, cause the hook ends of the brackets to pivot with the lips 102, 122 acting as fulcrums to rotate the hook ends in the direction shown by arrows 136, 138 as the bolts 112, 134 are tightened, thereby drawing the wheel cover 60 against a wheel. Tightening the bolts 112, 134 will ultimately immovably secure the brackets 68, 70 against the inner surface of the wheel liner 60.

Referring to FIGS. 4 and 10, to assemble a wheel liner 60 fitted with the bracket 68, 70 in accordance with this embodiment, the brackets are first attached to the wheel liner in their loosened condition and the brackets 68, 70 slide radially inward, the wheel liner 60 can be fitted inside the tubular portion of the wheel 74 wit h the axially extending wheel hub fitting into the high hat 64. By manipulating the heads of the bolts 112, 134, one can move the hook ends 78, 80, 82 radially outward to extend the associated fingers 90, 130, 132 through the adjacent hand holes 76—76 and along a portion of the inner surface of the web 77. Thereafter, tightening of the bolts 112, 134 will draw the hook ends 78, 80, 82 toward the outer rim 63 and thereby draw the wheel cover 60 against the wheel 74.

While the wheel cover 60 depicted in FIGS. 4 and 10 is adapted to attach to a wheel 74 having five hand holes 76, 76, it will be appreciated that by providing two identical brackets 68, one on each of the mounting plates 104, 106, as shown in FIG. 11, a wheel cover 138 can be adapted for attachment to a wheel 140 having two diametrically opposing hand holes 142, 144. A wheel cover 138 having two brackets 68 would be assembled to the wheel 140 in accordance with the same procedure as described with respect to the assembly of the wheel cover having brackets 68 and 70 described above.

While the present invention has been described in connection with the plurality of embodiments, it will be understood that many changes and modifications thereof may be made without departing from the true spirit and scope of the present invention, and it is intended by the appended claims to cover all such changes and modifications which come within the true spirit and scope of the invention.

What is claimed:

1. A cover for a vehicle wheel of the type having a web and a plurality of hand holes at given locations in said web, said hand holes having given dimensions, said web having an inner surface, said wheel cover comprising in combination:

a cover body shaped to cover at least a portion of said web of said wheel, said cover body having an inner surface;

an arm having a mounting portion and a finger;

said mounting portion and said finger being maintained in a fixed relationship to each other, retaining means for retaining said mounting portion to said inner surface of said cover body, a compressible member between said mounting portion and said inner surface, said compressible member having a relief condition and a compressed condition;

said arm pivotable about said mounting portion while said compressible member is in said relief condition whereby said finger can be inserted through one of said hand holes of said wheel and positioned along said inner surface of said web, and means for drawing said compressible member into a compressed condition whereby said finger is drawn toward said inner surface of said wheel cover.

2. A cover in accordance with claim 1 wherein said compressible member is made of rubber.

3. A cover in accordance with claim 1 wherein said means for drawing comprises a bolt and a nut.

4. A cover in accordance with claim 1 wherein said retaining means is a bolt and a nut.

5. A cover in accordance with claim 1 and further comprising a plurality of holes in said cover body through which said arms may be manipulated.

6. A cover for a vehicle wheel of the type having a web and a plurality of hand holes at given locations in said web, said hand holes having given dimensions and an edge, said web having an inner surface, said wheel cover comprising in combination:

a cover body shaped to cover at least a portion of said web of said wheel, said cover body having an inner surface;

a slide having a mounting portion and a finger, retaining means mounted on said inner surface of said cover body for slidably retaining said slide to said cover body with said slide moveable between a first position and a second position, said slide sized and positioned for insertion of said finger through a hand hole of said wheel while said slide is in said first position and said finger being extended behind a portion of said web of said wheel while said slide is in said second position, and means for retaining said slide in said second position.

7. A cover in accordance with claim 6 wherein said retaining means comprises a guide member on said inner surface of said cover body.

8. A cover in accordance with claim 6 wherein said slide is radially moveable between said first position and said second position.

9. A cover in accordance with claim 6 wherein said means for retaining is a threaded member.

10. A cover in accordance with claim 6 wherein said finger of said slide is pivotable about a fulcrum.

11. A cover in accordance with claim 6 wherein said mounting portion and said finger of said slide are maintained in a fixed relationship to each other.

12. A cover for a vehicle wheel of the type having a web and a plurality of hand holes having given dimensions, and an edge, the web having an inner surface, said wheel cover comprising in combination:

a cover body shaped to cover at least a portion of said web of said wheel, said cover body having an inner surface;

a slide on said inner surface of said cover body, said slide having a mounting portion and a finger, retaining means for slidably retaining said slide to said cover body with said slide radially moveable between a first position and a second position, said retaining means comprising a guide member on said inner surface of said cover body, said slide and said finger sized and positioned for insertion of said finger through a hand hole of said wheel while said slide is in said first position and for extending said finger behind a portion of said web of said wheel while said slide is in said second position, and means for retaining said slide in said second position.

13. A cover for a vehicle wheel of the type having a web and a plurality of hand holes at given locations in said web, said hand holes having given dimensions and an edge, said web having an inner surface, said wheel cover comprising in combination:

a cover body shaped to cover at least a portion of said web of said wheel, said cover body having an inner surface;

a slide on said inner surface of said cover, said slide having a mounting portion and a finger, retaining means for slidably retaining said slide to said cover body with said slide moveable between a first position and a second position, said slide and said finger sized and positioned for insertion of said finger through a hand hole of a said wheel while said slide is in said first position and for extending said finger behind a portion of said web of said wheel while said slide is in said second position, means for retaining said slide in said second condition, said finger of said slide being pivotable about a fulcrum, and a threaded member on said retaining means for pivoting said finger about said fulcrum by tightening said threaded member.

* * * * *